(12) United States Patent
Okubo

(10) Patent No.: US 11,415,868 B2
(45) Date of Patent: Aug. 16, 2022

(54) PROJECTION OPTICAL APPARATUS HAVING REINFORCING MEMBER AND PROJECTOR

(71) Applicant: SEIKO EPSON CORPORATION, Tokyo (JP)

(72) Inventor: Hirofumi Okubo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/906,540

(22) Filed: Jun. 19, 2020

(65) Prior Publication Data
US 2020/0401033 A1    Dec. 24, 2020

(30) Foreign Application Priority Data

Jun. 21, 2019    (JP) .............................. JP2019-115312

(51) Int. Cl.
| | |
|---|---|
| *G03B 21/14* | (2006.01) |
| *G03B 21/28* | (2006.01) |
| *G02B 13/16* | (2006.01) |
| *G02B 7/02* | (2021.01) |

(52) U.S. Cl.
CPC ........... *G03B 21/145* (2013.01); *G02B 13/16* (2013.01); *G03B 21/28* (2013.01); *G02B 7/02* (2013.01)

(58) Field of Classification Search
CPC ........ G03B 21/28; G03B 21/145; G02B 7/02; G02B 13/16
See application file for complete search history.

(56) References Cited

U.S. PATENT DOCUMENTS

| | | | | |
|---|---|---|---|---|
| 7,090,354 | B2 * | 8/2006 | Engle ..................... | G02B 13/06 348/836 |
| 7,175,287 | B2 * | 2/2007 | Gohman ................ | G02B 13/06 348/747 |
| 7,413,312 | B2 * | 8/2008 | Engle ..................... | G03B 21/10 348/836 |
| 7,805,071 | B2 * | 9/2010 | Mitani ................. | H04N 5/2257 396/535 |
| 10,168,609 | B2 * | 1/2019 | Kuroda .................... | G02B 7/02 |
| 10,281,806 | B2 * | 5/2019 | Kayano ............... | H04N 9/3141 |
| 10,409,145 | B2 * | 9/2019 | Kuroda .................... | H04N 5/74 |
| 10,473,902 | B2 * | 11/2019 | Shiokawa ........... | G02B 15/142 |
| 10,539,766 | B2 * | 1/2020 | Shiokawa ............. | G02B 13/16 |
| 10,642,135 | B2 * | 5/2020 | Kuroda .................. | G03B 21/28 |
| 10,754,238 | B2 * | 8/2020 | Nagatoshi ............. | G03B 21/28 |
| 10,768,397 | B2 * | 9/2020 | Amano .................. | G02B 13/22 |
| 10,890,741 | B2 * | 1/2021 | Amano ................... | G02B 13/22 |
| 10,890,742 | B2 * | 1/2021 | Amano ................... | G02B 13/06 |
| 10,942,437 | B2 * | 3/2021 | Kayano .................... | G02B 7/24 |
| 11,067,776 | B2 * | 7/2021 | Amano .................. | G02B 13/16 |

(Continued)

FOREIGN PATENT DOCUMENTS

JP        2016-156986 A       9/2016

*Primary Examiner* — Bao-Luan Q Le
(74) *Attorney, Agent, or Firm* — Oliff PLC

(57) ABSTRACT

A projection optical apparatus includes a first lens group, a first lens barrel holding the first lens group, a first optical path deflector disposed at a demagnifying side of the first lens group, a resin frame holding the first optical path deflector and including a first opening in which the first lens barrel is fitted, and a first reinforcing member disposed around an outer circumference of the first opening.

13 Claims, 5 Drawing Sheets

(56) References Cited

U.S. PATENT DOCUMENTS

| | | | | |
|---|---|---|---|---|
| 2004/0223123 | A1* | 11/2004 | Engle | G02B 13/06 |
| | | | | 353/69 |
| 2004/0233394 | A1* | 11/2004 | Gohman | G02B 13/16 |
| | | | | 353/70 |
| 2006/0290897 | A1* | 12/2006 | Engle | G03B 21/145 |
| | | | | 353/70 |
| 2009/0034962 | A1* | 2/2009 | Mitani | G03B 17/02 |
| | | | | 396/535 |
| 2016/0246034 | A1* | 8/2016 | Amano | G02B 13/0095 |
| 2016/0246035 | A1* | 8/2016 | Amano | G02B 13/06 |
| 2016/0246036 | A1* | 8/2016 | Amano | G02B 13/16 |
| 2016/0246037 | A1* | 8/2016 | Amano | G02B 13/22 |
| 2016/0246038 | A1* | 8/2016 | Amano | G02B 17/0896 |
| 2017/0343776 | A1* | 11/2017 | Nagatoshi | G02B 13/16 |
| 2017/0351070 | A1* | 12/2017 | Shiokawa | G02B 27/0025 |
| 2017/0363940 | A1* | 12/2017 | Kayano | G02B 13/16 |
| 2018/0164554 | A1* | 6/2018 | Shiokawa | G02B 13/16 |
| 2018/0217489 | A1* | 8/2018 | Kuroda | G02B 13/16 |
| 2019/0086783 | A1* | 3/2019 | Kuroda | G03B 21/00 |
| 2019/0101816 | A1* | 4/2019 | Kuroda | G02B 27/0955 |
| 2019/0155128 | A1* | 5/2019 | Shimizu | G03B 11/00 |
| 2019/0219802 | A1* | 7/2019 | Kuroda | G02B 17/023 |
| 2019/0219915 | A1* | 7/2019 | Kayano | G03B 21/14 |
| 2019/0361208 | A1* | 11/2019 | Mori | G02B 5/003 |
| 2020/0301267 | A1* | 9/2020 | Kuroda | G03B 21/28 |

* cited by examiner

PROJECTION OPTICAL APPARATUS HAVING REINFORCING MEMBER AND PROJECTOR

The present application is based on, and claims priority from JP Application Serial Number 2019-115312, filed Jun. 21, 2019, the disclosure of which is hereby incorporated by reference herein in its entirety.

BACKGROUND

1. Technical Field

The present disclosure relates to a projection optical apparatus and a projector that projects video light by using the projection optical apparatus.

2. Related Art

There has been a projector that enlarges video light produced by using light from a light source and projects the video light on a screen via a projection system. JP-A-2016-156986 discloses a projector of this type (projection-type display apparatus). The projection-type display apparatus disclosed in JP-A-2016-156986 deflects the optical path by using an optical path deflector, such as a mirror, when projecting the video light produced by a light modulator (light valve) in accordance with image information on the screen.

In the projection optical apparatus, in which the optical path deflector, such as a mirror, is disposed in the middle of the optical path, a frame that holds the optical path deflector is typically a component separate from a lens barrel, and the lens barrel is bonded to the frame that folds the optical path deflector.

In the projection optical apparatus, however, a lens disposed in a position closest to the magnifying side has a large weight, so that a large load acts on a portion where the lens barrel that holds the magnifying-side lens group is bonded to the frame that holds the optical path deflector, such as a mirror. When the lens barrel and the frame are made of resin, it is conceivable to increase the thickness of each of the lens barrel and the frame to prevent deformation of the bonding portion and improve the durability thereof. When the thickness of each of the lens barrel and the frame is increased, however, the weight of the members increases and the elasticity of the members decreases, resulting in problems of breakage of the members due to impact exerted when the projection optical apparatus falls and a decrease in optical performance of the projection optical apparatus due to positional shift between the optical parts.

SUMMARY

An advantage of the present disclosure is to reinforce a portion where a lens barrel is bonded to a frame that holds an optical path deflector with no increase in weight of each of the lens barrel and the frame or no decrease in elasticity thereof.

A projection optical apparatus according to the present disclosure includes a first lens group, a first lens barrel holding the first lens group, a first optical path deflector disposed at a demagnifying side of the first lens group, a resin frame holding the first optical path deflector and including a first opening in which the first lens barrel is fitted, and a first reinforcing member disposed around an outer circumference of the first opening.

A projector according to the present disclosure includes a light modulator and the projection optical apparatus described above, which projects video light modulated by the light modulator.

DESCRIPTION OF EXEMPLARY EMBODIMENTS

First Embodiment

Overall Configuration

Figure 1:
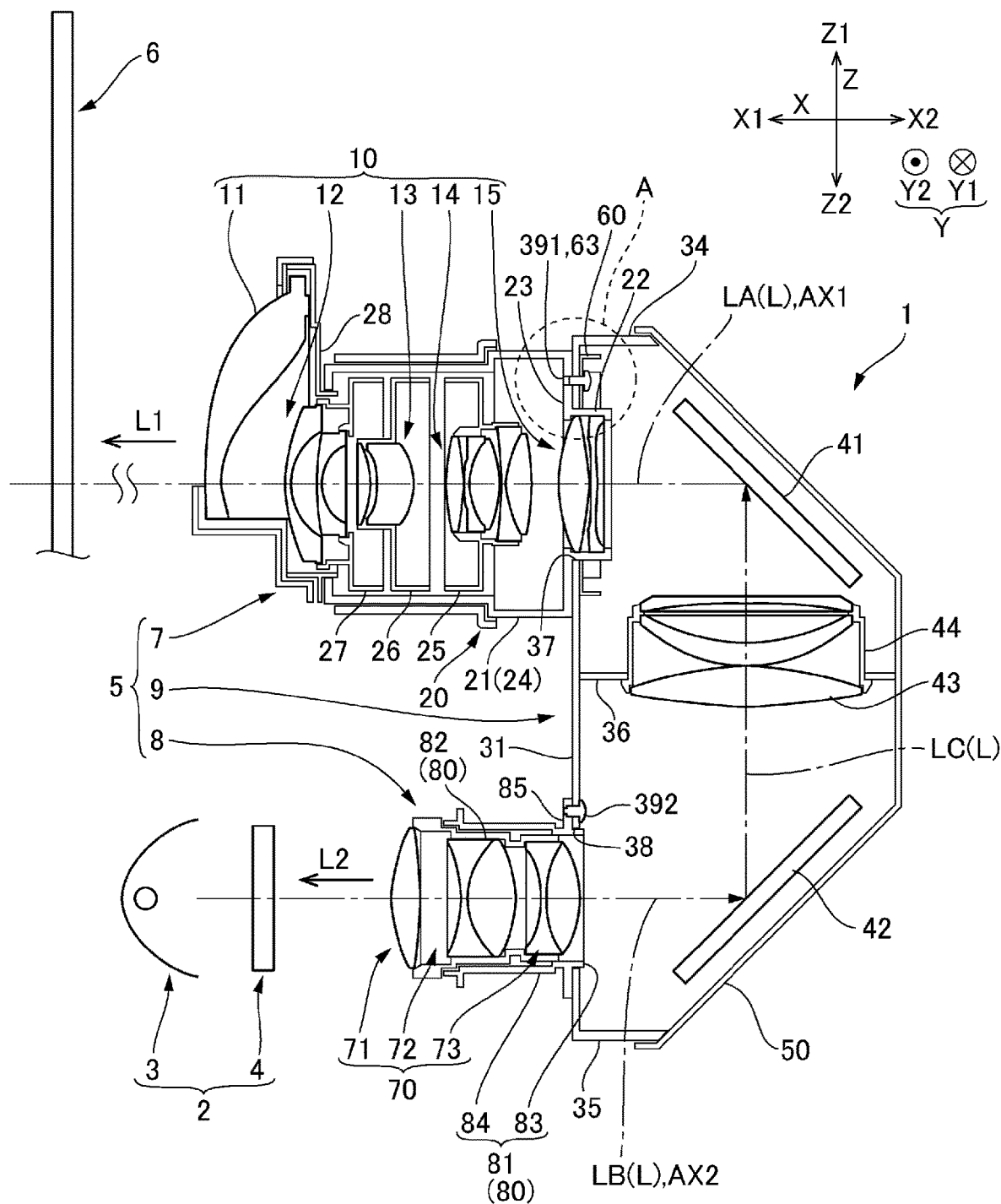
FIG. 1 is a schematic configuration diagram of a projector including a projection optical apparatus according to a first embodiment.

Exemplary embodiments of the present disclosure will be described below with reference to the drawings. FIG. 1 is a schematic configuration diagram of a projector 1 including a projection optical apparatus according to a first embodiment. The projector 1 includes a video light generator 2 and a projection optical apparatus 5, as shown in FIG. 1. The video light generator 2 and the projection optical apparatus 5 are disposed in an exterior enclosure that is not shown. The exterior enclosure accommodates a fan for cooling the interior of the projector 1, a power supply, a controller, and other components in addition to the configuration described above.

The video light generator 2 includes a light source 3 and a light modulator 4. The projection optical apparatus 5 enlarges and projects video light produced by the light modulator 4. The light modulator 4 modulates R light (red light), G light (green light), and B light (blue light) outputted from the light source 3 in accordance with image information to produce the video light. The video light generator 2 may operate based on a scheme in which the single light modulator 4 modulates the three types of color light, the R light, the G light, and the B light, or a scheme in which three light modulators 4 are assigned to the R light, the G light, and the B light.

In the present specification described below, three directions perpendicular to one another are called a first direction X, a second direction Y, and a third direction Z. Let L be the optical path of the light from the projection optical apparatus 5, and the one side and the other side of the optical path L are defined as follows: The side via which the projection optical apparatus 5 outputs the light (light exiting side) is called a magnifying side L1; and the side via which the light enters the projection optical apparatus 5 (light incident side) is called a demagnifying side L2. The third direction Z is the vertical direction in a state in which the projector 1 is normally installed. Therefore, one side of the third direction Z is called an upper side Z1, and the other side of the third direction Z is called a lower side Z2. The projection optical apparatus 5 outputs the light in the direction opposite the direction in which the light from the video light generator 2 enters the projection optical apparatus 5. One side X1 of the first direction X coincides with the light exiting direction in which the projection optical apparatus 5 outputs the light, and another side X2 of the first direction X coincides with the light incident direction in which the light from the video light generator 2 enters the projection optical apparatus 5. The second direction Y is the width direction of the projection optical apparatus 5, with one side of the width direction called Y1 and the other side thereof called Y2.

The projection optical apparatus 5 enlarges the video light incident from the video light generator 2 and projects the enlarged video light on a screen 6, as shown in FIG. 1. The projection optical apparatus 5 includes a first lens unit 7, a second lens unit 8, and an intermediate unit 9. The optical path L of the light from the projection optical apparatus 5 has a first optical path section LA, which coincides with an optical axis AX1 of the first lens unit 7, a second optical path section LB, which coincides with a optical axis AX2 of the second lens unit 8, and a third optical path section LC, which is perpendicular to the first optical path section LA and the second optical path section LB. The optical axis AX1 of the first lens unit 7 and the optical axis AX2 of the second lens unit 8 are parallel to each other and separate from each other in the third direction Z. In the present embodiment, a U-letter-shaped optical path including the third optical path section LC is formed in the intermediate unit 9, the optical path L extending toward one side of the optical axis of the second lens unit 8 (side X2) is redirected, specifically, reversed in the intermediate unit 9.

The first lens unit 7 includes a first lens group 10, which is provided in a position closest to the magnifying side L1, and a first lens barrel 20, which holds the first lens group 10. The first lens group 10 includes a front lens 11, a lens group 12, a lens group 13, a lens group 14, and a lens group 15. The front lens 11 is a lens disposed in a position closest to the magnifying side L1 (side X1) out of the lenses in the first lens group 10. The front lens 11 is so shaped that an edge portion thereof facing the lower side Z2 is truncated, and the projection optical apparatus 5 enlarges and projects the video light via the front lens 11 toward the upper side Z1. In the present specification, the term "lens group" is not limited to a lens group formed of a plurality of lenses and may be a lens group formed of a single lens. Further, the lenses that form the first lens group 10 do not necessarily have the configuration shown in FIG. 1. The first lens barrel 20 includes a plurality of lens barrels that hold the first lens group 10, a zoom mechanism that moves part of the plurality of lens barrels in the optical axis AX1 relative to the other lens barrels, a focus mechanism, and other components.

The first lens barrel 20 includes a fixing casing 21, which holds the lens group 15, which is a lens group located in a position closest to the demagnifying side out of the lens groups in the first lens group 10. The fixing casing 21 includes a first tube 22, which is provided at the X2-side end of the first lens group 10, an end plate 23, which extends outward from the X1-side end of the first tube 22, and a second tube 24, which extends from the outer circumferential edge of the end plate 23 toward the side X1. The lens group 15 is disposed inside the inner circumference of the first tube 22. Lens barrels 25, 26, and 27, which hold the lens groups 12, 13, and 14, are disposed inside the inner circumference of the second tube 24, and a lens barrel 28, which holds the front lens 11, is disposed at the X1-side end of the second tube 24.

The intermediate unit 9 includes a resin frame 30, a first mirror 41 and a second mirror 42, which are held by the resin frame 30, a third lens group 43, and a cover frame 50, which is fixed to the an X2-side portion of the resin frame 30. The first mirror 41 and the second mirror 42 are separate from each other in the third direction Z, and the second mirror 42 is located on the lower side Z2 of the first mirror 41. The third lens group 43 is held by a third lens barrel 44 and disposed in the optical path between the first mirror 41 and the second mirror 42.

The first mirror 41 is a first optical path deflector disposed at the demagnifying side of the first lens group 10. The first mirror 41 is disposed in the optical axis AX1 of the first lens unit 7. The second mirror 42 is a second optical path deflector disposed in the optical path between the first mirror 41 and the second lens unit 8. The second mirror 42 is disposed in the optical axis AX2 of the second lens unit 8. The second mirror 42 inclines by 45° with respect to the optical axis AX2 of the second lens unit 8 and reflects light incident from the second lens unit 8 in such a way that the light travels in the direction Z1. The first mirror 41 inclines by 45° with respect to the optical axis AX1 of the first lens unit 7 and reflects the light incident from the second mirror 42 via the third lens group 43 in such a way that the light travels in the direction X1 to cause the light to enter the first lens unit 7. The first mirror 41 and the second mirror 42 thus redirect the optical path L extending toward one side of the optical axis AX2 of the second lens unit 8 (side X2) toward the other side (side X1).

Figure 2:
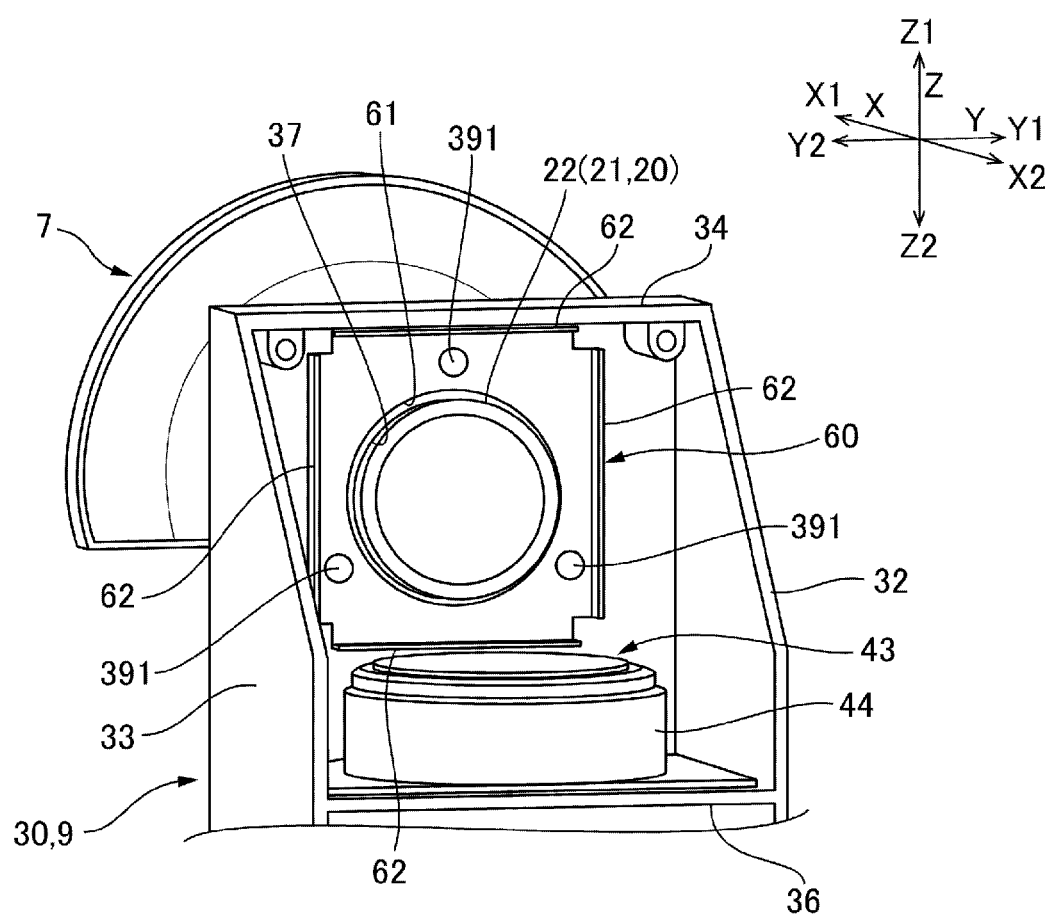
FIG. 2 is a partial perspective view of a portion where a first lens barrel is bonded to a resin frame with the portion viewed from a demagnifying side.

FIG. 2 is a partial perspective view of a portion where a first lens barrel 20 is bonded to the resin frame 30 with the portion viewed from the side X2 and shows the state in which the first mirror 41 and the cover frame 50 are detached from the resin frame 30. The resin frame 30 includes a front plate 31, which extends in the third direction Z from the side X2 of the first lens unit 7 toward the side X2 of the second lens unit 8, a pair of side plates 32 and 33, which are parallel to each other and extend toward the side X2 from the Y1-side edge and the Y2-side edge of the front plate 31, respectively, a connection plate 34, which connects the Z1-side ends of the side plates 32 and 33 to each other, a connection plate 35, which connects the Z2-side ends of the side plates 32 and 33 to each other, and a fixing casing 36, which is disposed in a position substantially at the center of the resin frame 30 in the third direction Z, as shown in FIGS. 1 and 2. The third lens barrel 44 is disposed in an opening provided in the fixing casing 36.

The resin frame 30 has a first opening 37, which passes in the first direction X through a portion of the front plate 31 that is a portion facing the upper side Z1, and a second opening 38, which passes in the first direction X through a portion of the front plate 31 that is a portion facing the lower side Z2, as shown in FIG. 1. The first opening 37 is a circular opening around the optical axis AX1 of the first lens unit 7, and the first tube 22, which is provided at the X2-side end of the first lens barrel 20, is fit in the first opening 37. The second opening 38 is a circular opening around the optical axis AX2 of the second lens unit 8, and a first tube 83, which is provided at the X2-side end of a second lens barrel 80, which will be described later, is fit in the second opening 38.

The first lens barrel 20 is so configured that the end plate 23 is in contact with an X1-side portion of the front plate 31 of the resin frame 30 and the front plate 31 and the end plate 23 are fastened to each other in screw clamping around the outer circumference of the first opening 37 at three locations separate from each other in the circumferential direction. A first reinforcing member 60, which has a rectangular shape, is disposed at the side X2 of the front plate 31 around the outer circumference of the first opening 37, as shown in FIG. 2. When the front plate 31 and the end plate 23 are fastened to each other in screw clamping, the first reinforcing member 60 is fixed together with the front plate 31 and the end plate 23 by first fixing members 391 to a portion where the front plate 31 and the end plate 23 are bonded to each other.

The second lens unit 8 includes a second lens group 70, which is so disposed as to be shifted from the first mirror 41 toward the demagnifying side, and the second lens barrel 80, which holds the second lens group 70, as shown in FIG. 1. The second lens group 70 includes lens groups 71, 72, and 73. The configuration of the second lens group 70 is not limited to the configuration shown in FIG. 1. The second lens barrel 80 includes a fixing casing 81 and a lens barrel 82, which is held by the fixing casing 81, and the lens groups 71, 72, and 73 are held by the lens barrel 82. The fixing casing 81 includes a first tube 83, which is provided at the X2-side end of the fixing casing 81, a second tube 84, which is located on the side X1 of the first tube 83 and so formed as to have a diameter greater than the diameter of the first tube 83, and a flange 85, which extends outward from the first tube 83.

The second lens barrel 80 is so configured that the flange 85 is in contact with an X1-side portion of the front plate 31 of the resin frame 30. The flange 85 and the front plate 31 are fastened to each other by second fixing members 392 in screw clamping around the outer circumference of the second opening 38 at three locations separate from each other in the circumferential direction.

Reinforcing Member

The first reinforcing member 60 is formed of a rectangular metal plate, and a circular opening 61 is provided substantially at the center of the first reinforcing member 60, as shown in FIG. 2. The first reinforcing member 60 may instead have a shape other than a rectangular shape. For example, the first reinforcing member 60 may have a circular shape or a polygonal shape other than a rectangular shape. In the present embodiment, the first reinforcing member 60 is disposed at the side (side X2) opposite the side where the first lens barrel 20 is located (side X1) with the resin frame 30 interposed between the first reinforcing member 60 and the first lens barrel 20. The first reinforcing member 60 is so positioned that the first opening 37 is located in the opening 61 and surrounds the entire circumference of the first opening 37. The four corners of the outer circumferential edge of the first reinforcing member 60 are truncated. Bent parts 62, which are bent toward the side X2 substantially at right angles, are formed along the outer circumferential edges excluding the truncated portions.

Figure 3:
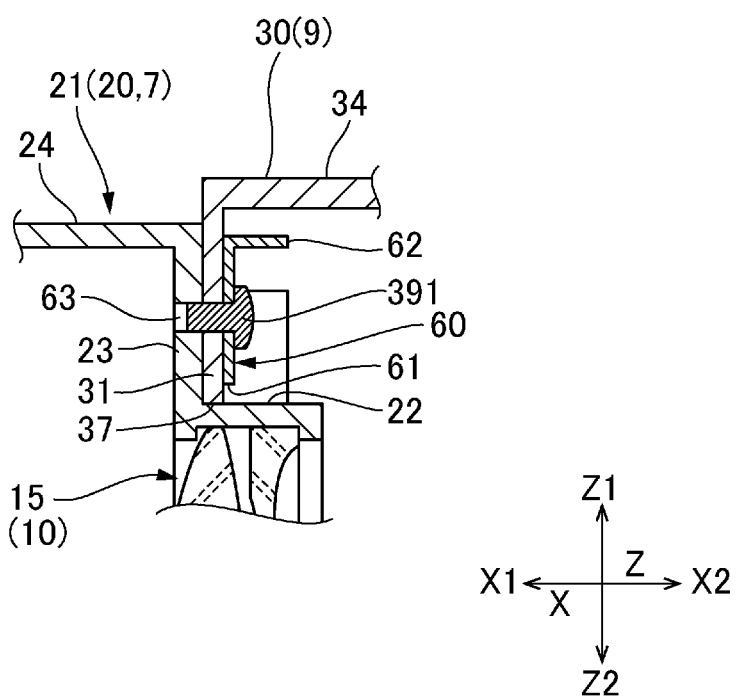
FIG. 3 is a partial cross-sectional view of the portion where the first lens barrel is bonded to the resin frame.

FIG. 3 is a partial cross-sectional view of the portion where the first lens barrel 20 is bonded to the resin frame 30 and is a partially enlarged view of an area A in FIG. 1. Around the outer circumference of the first opening 37, the following three members: the endplate 23 of the first lens barrel 20; the front plate 31 of the resin frame 30; and the first reinforcing member 60 are overlaid on each other in the presented order from the side X1 toward the side X2, as shown in FIG. 3. First through holes 63, which pass in the first direction X through the portion where the three members, the end plate 23, the front plate 31, and the first reinforcing member 60, are overlaid on each other, are provided around the outer circumference of the first opening 37, and the first fixing members 391 are disposed in the first through holes 63. In the present embodiment, the through holes 63 are provided at three locations separate from each other in the circumferential direction, and the first fixing members 391 are disposed in the first through holes 63.

The first fixing members 391 are each a screw. The first fixing members 391 set on the side X2 are inserted into the first through holes 63 and caused to engage with female threads formed on the inner surfaces of the first through holes 63. The engagement of the first fixing members 391 is performed with the cover frame 50 and the first mirror 41 detached from the resin frame 30, as shown in FIG. 2.

Primary Effects Provided by First Embodiment

The projector 1 according to the first embodiment includes the light source 3, the light modulator 4, and the projection optical apparatus 5, which enlarges and projects the video light modulated by the light modulator 4, as described above. The projection optical apparatus 5 according to the first embodiment includes the first lens group 10, which is disposed in a position closest to the magnifying side L1, the first lens barrel 20, which holds the first lens group 10, the first mirror 41, which is the first optical path deflector disposed at the demagnifying side of the first lens group 10, and the resin frame 30, which holds the first mirror 41. The resin frame 30 is provided with the first opening 37, in which the first lens barrel 20 is fit, and the first reinforcing member 60 is disposed around the outer circumference of the first opening 37.

As described above, the projection optical apparatus 5 according to the first embodiment includes the first optical path deflector for deflecting the optical path of the light incident from the light modulator 4, and the first reinforcing member 60 is disposed on the portion where the first lens barrel 20, which holds the first lens group 10 including the front lens 11, which is the heaviest component, is bonded to the resin frame 30, which holds the first mirror 41, which is the first optical path deflector. The first reinforcing member 60 is disposed around the outer circumference of the first opening 37, in which the first lens barrel 20 is fit. Therefore, since the first reinforcing member 60 reinforces the outer circumference of the portion in which the first lens barrel 20, which holds the heavy lens, is fit, impact exerted when the projector 1 falls can be suppressed can be decentralized. Therefore, deformation and breakage of the bonding portion due to impact exerted when the projector 1 falls can be suppressed. Further, positional shift of the first lens group 10 due to the impact can be suppressed, whereby a decrease in optical performance of the projector 1 can be suppressed.

In the first embodiment, the following three members: the end plate 23, which is a portion of the first lens barrel 20 that is the portion disposed around the outer circumference of the first opening 37; the resin frame 30; and the first reinforcing member 60 are overlaid on each other in the first direction X. The first through holes 63, which pass through the portion where the three members are overlaid on each other, are provided, and the first fixing members 391 are disposed in the first through holes 63. In the configuration described above, the first reinforcing member 60 allows dicentration of the load that concentrates at the locations where the first fixing members 391 are provided, whereby the impact exerted when the projector 1 falls can be decentralized. Therefore, deformation and breakage of the bonding portion due to the impact can be suppressed. Further, the three members, the first lens barrel 20, the resin frame 30, and the first reinforcing member 60, are so fixed as to be fastened together, whereby no dedicated fixing member for attaching the first reinforcing member 60 is required. The number of fixing members can therefore be reduced, whereby the number of parts can be reduced. The assembly manhours can also be reduced.

The first reinforcing member 60 is disposed at the side (side X2) opposite the side where the first lens barrel 20 is located (side X1) with the resin frame 30 interposed between the first reinforcing member 60 and the first lens barrel 20.

The arrangement described above allows the resin frame 30 to be sandwiched between the first lens barrel 20 and the first reinforcing member 60, whereby deformation and breakage of the resin frame 30 can be suppressed. Further, after the first lens barrel 20 and the resin frame 30 are assembled, the first reinforcing member 60 can be positioned on the side opposite the first lens barrel 20, whereby the first reinforcing member 60 is readily attached.

Since the first reinforcing member 60 is so shaped as to surround the entire circumference of the first opening 37, whereby the rigidity of the entire outer circumference of the first opening 37 can be increased. Further, the impact exerted when the projector 1 falls can be distributed across the entire circumference of the first opening 37. Deformation and breakage due to the impact exerted when the projector 1 falls can therefore be suppressed.

The first reinforcing member 60 is formed of a metal plate. The first reinforcing member 60 includes the bent parts 62, which are bent edge portions of the first reinforcing member 60. Using a metal plate as described above allows an increase in the rigidity of the portion where the first lens barrel 20 is bonded to the resin frame 30 irrespective of the fact that the first reinforcing member 60 is a light-weight, small reinforcing member. Further, the bent parts 62 can increase the rigidity of the first reinforcing member 60, whereby the reinforcing effect can be further increased. A configuration in which the bent parts 62 are omitted may instead be employed.

Figure 4:
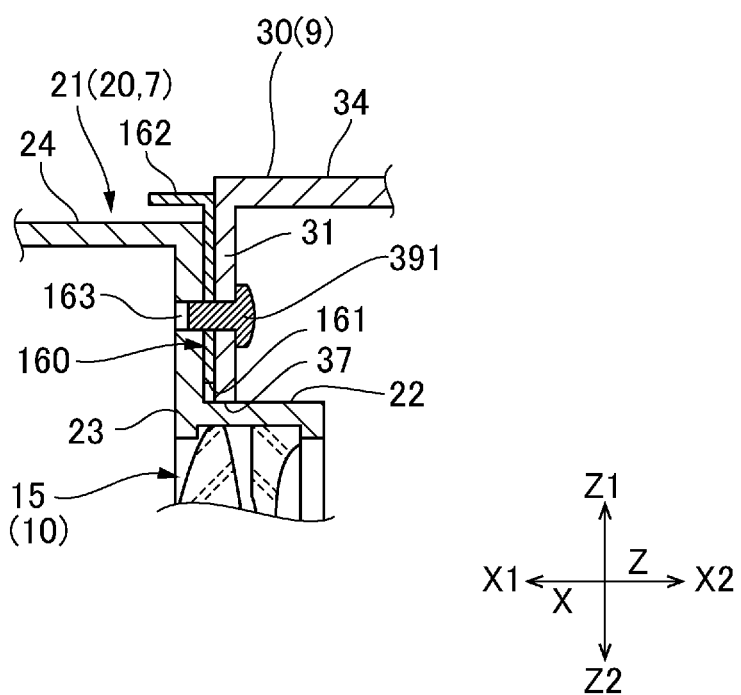
FIG. 4 is a cross-sectional view showing an example of a change in the arrangement of a first reinforcing member.

Variations (1) FIG. 4 is a cross-sectional view showing an example of a change in the arrangement of the first reinforcing member 60. In the first embodiment described above, the first reinforcing member 60 is disposed at the side (side X2) opposite the side where the first lens barrel 20 is located (side X1) with the resin frame 30 interposed between the first reinforcing member 60 and the first lens barrel 20 in the first direction X, a first reinforcing member 160 may be disposed between the resin frame 30 and the first lens barrel 20, as shown in FIG. 4. The first reinforcing member 160 is provided with an opening 161 at the center of the first reinforcing member 160 and bent parts 162 along the outer circumferential edge of the first reinforcing member 160, as in the first embodiment described above. The bent parts 162 are so located as not to interfere with the first lens barrel 20. A configuration in which the bent parts 162 are omitted may instead be employed. Also in the embodiment shown in FIG. 4, the first reinforcing member 160 can increase the rigidity of the portion where the first lens barrel 20 is bonded to the resin frame 30.

(2) In the first embodiment described above, the first reinforcing member 60 is so disposed as to surround the entire circumference of the first opening 37. Instead, the first reinforcing member 60 may be disposed only around a circumferential part of the outer circumference of the first opening 37. Still instead, the first reinforcing member 60 may be disposed in a plurality of circumferential locations around the outer circumference of the first opening 37. For example, the first reinforcing member 60 may be disposed at each of three locations where the first fixing members 391 for bonding the first lens barrel 20 to the resin frame 30 are disposed. The configuration described above also allows an increase in the rigidity of the portion where the first lens barrel 20 is bonded to the resin frame 30.

Second Embodiment

Figure 5:
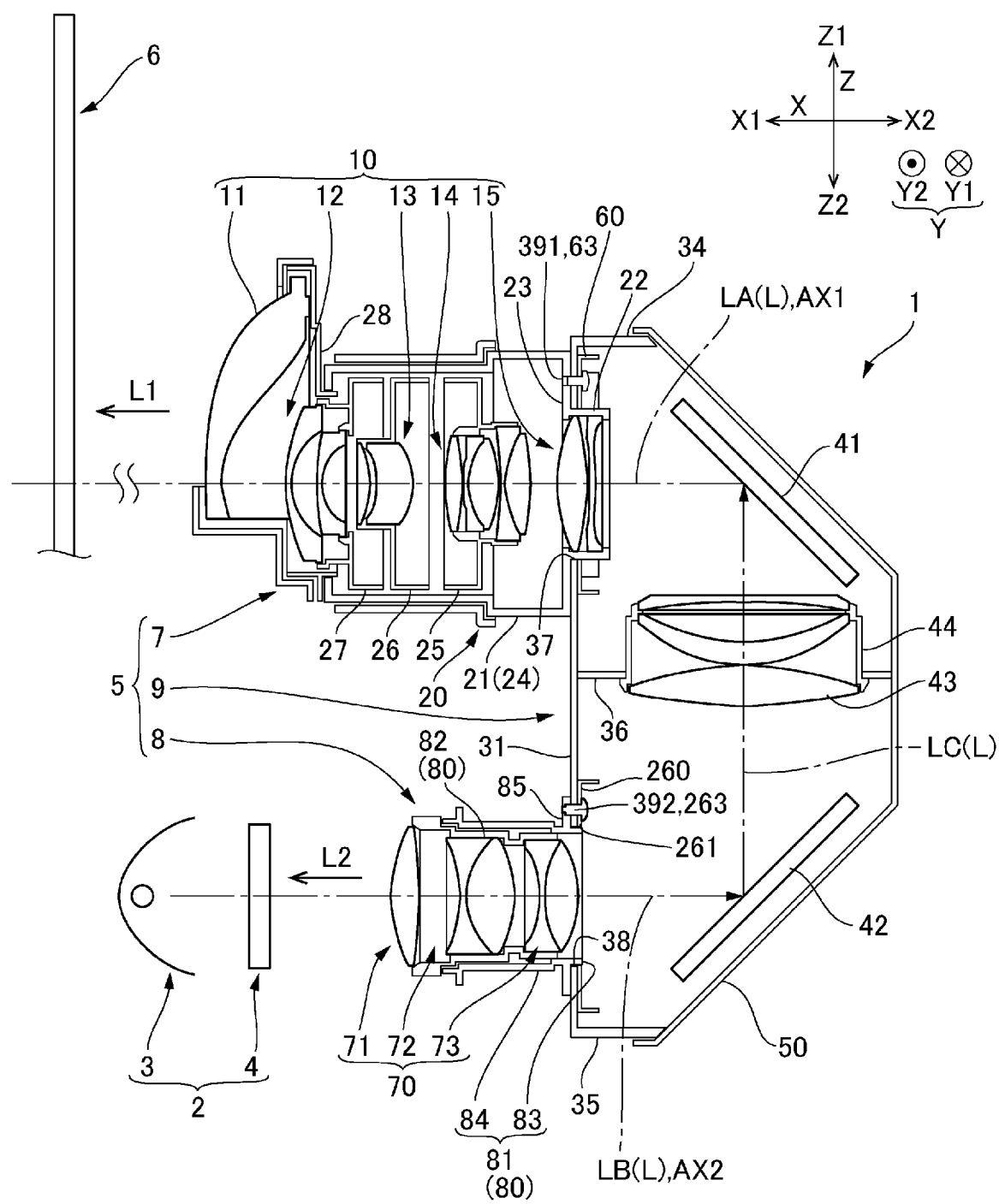
FIG. 5 is a schematic configuration diagram of a projector including a projection optical apparatus according to a second embodiment.

FIG. 5 is a schematic configuration diagram of a projector including a projection optical apparatus according to a second embodiment. Only points different from those in the first embodiment will be described below, and the same configurations as those in the first embodiment have the same reference characters and will not be described. In the second embodiment, the first reinforcing member 60 is disposed in the portion where the first lens barrel 20 is bonded to the resin frame 30, and a second reinforcing member 260 is disposed in the portion where the second lens barrel 80 is bonded to the resin frame 30.

The projection optical apparatus 5 according to the second embodiment includes the same optical system as that in the first embodiment, as shown in FIG. 5. That is, the projection optical apparatus 5 includes the first lens group 10, the first mirror 41, which is the first optical path deflector disposed at the demagnifying side of the first lens group 10, the second lens group 70, which is disposed at the demagnifying side of the first mirror 41, and the second lens barrel 80, which holds the second lens group 70. The projection optical apparatus 5 further includes the second mirror 42, which is held by the resin frame 30, and the second mirror 42 is disposed in the optical path between the second lens group 70 and the first mirror 41.

The resin frame 30 is provided with the second opening 38, in which the second lens barrel 80 is fit, and the second reinforcing member 260 is disposed around the outer circumference of the second opening 38. The second reinforcing member 260 is formed of a rectangular metal plate, as is the first reinforcing member 60. The structure that allows the second reinforcing member 260 to be attached to the portion where the second lens barrel 80 is bonded to the resin frame 30 is the same as the structure that allows the first reinforcing member 60 to be attached to the portion where the first lens barrel 20 is bonded to the resin frame 30, as will be described below.

The second reinforcing member 260 is disposed at the side (side X2) opposite the side where the second lens barrel 80 is located (side X1) with the front plate 31 of the resin frame 30 interposed between the second reinforcing member 260 and the second lens barrel 80. The second reinforcing member 260 is so positioned that the second opening 38 of the resin frame 30 is located in an opening 261 formed substantially at the center of the second reinforcing member 260 and surrounds the entire circumference of the second opening 38. The first tube 83 of the second lens barrel 80 is fit in the second opening 38. Bent parts 262 are formed along the outer circumferential edge of the second reinforcing member 260.

Around the outer circumference of the second opening 38, the following three members: the flange 85 of the second lens barrel 80; the front plate 31 of the resin frame 30; and the second reinforcing member 260 are overlaid on each other in the presented order from the side X1 toward the side X2. Second through holes 263, which pass in the first direction X through the portion where the three members, the flange 85, the front plate 31, and the second reinforcing member 260, are overlaid on each other, are provided around the outer circumference of the second opening 38 at three locations separate from each other in the circumferential direction. The second fixing members 392 are disposed in the second through holes 263 at the three locations.

The second fixing members 392 are each a screw. The second fixing members 392 set on the side X2 are inserted into the second through holes 263 and caused to engage with female threads formed on the inner surfaces of the second through holes 263. The engagement of the second fixing members 392 is performed with the cover frame 50 and the second mirror 42 detached from the resin frame 30.

In the second embodiment, not only is the first reinforcing member 60 disposed on the portion where the first lens barrel 20 is bonded to the resin frame 30, but the second reinforcing member 260 is disposed on the portion where the second lens barrel 80 is bonded to the resin frame 30, and the second reinforcing member 260 is disposed around the outer circumference of the second opening 38, in which the second lens barrel 80 is fit. Deformation or breakage of the portion where the second lens barrel 80 is bonded to the resin frame 30 due to impact exerted when the projector 1 falls can therefore be suppressed. Further, positional shift of the second lens group 70 due to the impact can be suppressed, whereby a decrease in optical performance of the projector 1 can be suppressed. The variation of the first embodiment is also applicable to the second embodiment.

What is claimed is:

1. A projection optical apparatus comprising:
    a first lens group having an optical axis and a plurality of lenses;
    a first lens barrel holding the first lens group;
    a first mirror disposed at a demagnifying side of the first lens group;
    a resin frame holding the first mirror and including a first opening in which the first lens barrel is fitted;
    an inside space enclosed by the resin frame, the first mirror and at least one lens of the first lens group being within the inside space;
    an outside space that is outside the inside space and separated from the inside space by the resin frame;
    a first through hole configured to accommodate a first screw to fix the resin frame and the first lens barrel together, the first through hole being provided within the inside space; and
    a first reinforcing metal disposed around an outer circumference of the first opening,
    wherein a portion of the resin frame is sandwiched between the first lens barrel and the first reinforcing metal in a direction parallel to the optical axis of the first optical lens group.

2. The projection optical apparatus according to claim 1, wherein:
    the first screw fixes the first lens barrel and the first reinforcing metal with respect to the resin frame,
    the first through hole is included in the first lens barrel, the resin frame and the first reinforcing metal and disposed outside the first opening and passing through a portion where the first lens barrel, the resin frame, and the first reinforcing metal overlap each other, and
    the first screw is disposed in the first through hole.

3. The projection optical apparatus according to claim 1, wherein the first reinforcing metal is disposed at an opposite side to a first lens barrel side with respect to the resin frame.

4. The projection optical apparatus according to claim 1, wherein the first reinforcing metal is disposed between the resin frame and the first lens barrel.

5. The projection optical apparatus according to claim 1, wherein the first reinforcing metal surrounds the entire outer circumference of the first opening.

6. The projection optical apparatus according to claim 1, wherein the first reinforcing metal is disposed at a plurality of locations along the outer circumference of the first opening.

7. The projection optical apparatus according to claim 1, wherein the first reinforcing metal includes a bent part being a bent edge portion of the first reinforcing metal.

8. The projection optical apparatus according to claim 1, wherein the first reinforcing metal is formed of a metal plate.

9. The projection optical apparatus according to claim 1, further comprising:
    a second lens group disposed at the demagnifying side of the first mirror;
    a second lens barrel holding the second lens group; and
    a second reinforcing metal disposed around an outer circumference of a second opening which the resin frame includes and in which the second lens barrel is fitted.

10. The projection optical apparatus according to claim 9, further comprising:
    a second screw fixing the second lens barrel and the second reinforcing metal with respect to the resin frame,
    wherein the second lens barrel, the resin frame and the second reinforcing metal include a second through hole disposed outside the second opening and passing through a portion where the second lens barrel, the resin frame, and the second reinforcing metal overlap each other, and
    the second screw is disposed in the second through hole.

11. The projection optical apparatus according to claim 9, further comprising:
    a second mirror held by the resin frame and disposed in an optical path between the first mirror and the second lens group.

12. The projection optical apparatus according to claim 9, wherein a first optical axis of the first lens group is substantially parallel to a second optical axis of the second lens group, and
    the first mirror and the second mirror redirect light which is emitted from the second lens group and which passes in a first direction, to a second direction opposite to the first direction.

13. A projector comprising:
    a light modulator; and
    the projection optical apparatus according to claim 1, which projects video light modulated by the light modulator.

* * * * *